United States Patent [19]

Desverchere

[11] 4,247,510
[45] Jan. 27, 1981

[54] PROCESS FOR DEPOSITING AN ELASTOMERIC OR THERMOSETTING BANK ON A SUPPORT

[75] Inventor: Jean Desverchere, Lyons, France

[73] Assignee: Cefilac, Paris, France

[21] Appl. No.: 102,269

[22] Filed: Dec. 10, 1979

Related U.S. Application Data

[63] Continuation of Ser. No. 778,336, Mar. 17, 1977, abandoned.

[30] Foreign Application Priority Data

Apr. 2, 1976 [FR] France ................. 76 10172
Nov. 24, 1976 [FR] France ................. 76 36153

[51] Int. Cl.³ .............. B29C 5/00; B29C 25/00; B29G 3/00; B29H 9/10
[52] U.S. Cl. ................... 264/236; 264/259; 264/336; 264/328.18
[58] Field of Search ........... 264/234, 236, 241, 259, 264/265, 328, 336, 345, 347

[56] References Cited

U.S. PATENT DOCUMENTS

| | | | |
|---|---|---|---|
| 2,309,042 | 1/1943 | Boyle | 264/259 |
| 2,337,555 | 12/1943 | Hosking | 264/259 |
| 2,617,151 | 11/1952 | Rubin | 264/127 |
| 2,617,152 | 11/1952 | Rubin | 264/127 |
| 2,865,046 | 12/1958 | Bird | 264/257 |
| 3,176,057 | 3/1965 | Peters et al. | 264/259 |
| 3,207,825 | 9/1965 | Tully | 264/236 |
| 3,228,894 | 1/1966 | Jeckel | 264/127 |
| 3,250,653 | 5/1966 | Geist et al. | 156/171 |
| 3,281,512 | 10/1966 | Reiling | 264/127 |
| 3,526,694 | 9/1970 | Lemelson | 264/259 |
| 3,701,702 | 10/1972 | Schichman et al. | 264/236 |
| 3,860,684 | 1/1975 | Vance | 264/236 |
| 3,876,616 | 4/1975 | Tang | 526/254 |
| 3,897,291 | 7/1975 | Hoback et al. | 264/250 |
| 4,006,210 | 2/1977 | Denton | 264/259 |

FOREIGN PATENT DOCUMENTS

| | | | |
|---|---|---|---|
| 576138 | 5/1959 | Canada | 264/127 |
| 840686 | 7/1960 | United Kingdom | 264/259 |

OTHER PUBLICATIONS

Whitby et al., Synthetic Rubber, Wiley (1956) N. Y. p. 376 Relied on.

Primary Examiner—W. E. Hoag
Attorney, Agent, or Firm—Webb, Burden, Robinson & Webb

[57] ABSTRACT

The invention relates to a method and apparatus for manufacturing bands of elastomeric or thermosetting material of the type used in making impervious seals and gaskets. The process consists in molding or injecting at ambient temperature the elastomeric or thermosetting material in the viscous state into a molding cavity on a support which, compared to the material being deposited, has an adherence that is greater than that of the molding cavity. Subsequently, the deposited material is vulcanized or polymerized into the desired band configuration.

12 Claims, 9 Drawing Figures

PROCESS FOR DEPOSITING AN ELASTOMERIC OR THERMOSETTING BANK ON A SUPPORT

RELATED APPLICATION

This is a continuation of Application Ser. No. 778,336, filed Mar. 17, 1977, now abandoned.

FIELD OF THE INVENTION

The present invention is directed to impervious bands of the type used as seals and gaskets and, more particularly, to method and apparatus for depositing an elastomeric or thermosetting material in a mold cavity defined by adjacent members wherein one member has a greater adherence for said material being deposited than the other member.

DESCRIPTION OF THE PRIOR ART

Impervious gaskets, especially those used in the automotive industry such as cylinder head gaskets, collector joints, etc., are formed of a generally flat support made of different materials such as metallic, metalloplastic, or fibrous materials with an asbestos or cellulose base having orifices for the passage therethrough of fluids such as motor gases, lubricating oil, cooling water, etc. Tightness is assured around these orifices in numerous cases through the use of a band of elastomeric or thermosetting material which surrounds the orifice and is flattened when the connection is tightened.

Several techniques are known for depositing the band on the support.

A band can be obtained by casting in a mold or by injecting the elastomeric or thermosetting material at a temperature between 100° and 200° C. while using molds heated to this temperature. For a given material and a band of a given geometric configuration, the process consists of carrying out the casting or the injection at such a temperature and for such a duration that the product will have the time to fill the mold in the viscous state and to assume its definitive consistency either by polymerization or vulcanization before final molding takes place.

This process has significant drawbacks. On the one hand, it is necessary to wait for the vulcanization or polymerization of the band before being able to mold which, as the case may be, takes from 3 to 10 minutes and thereby places restraints on high rates of manufacturing. On the other hand, substantial amounts of raw material, which can amount to 90%, corresponding to the volume of the injection channels is lost. Generally this material cannot be recycled and constitutes worthless scrap.

For certain types of joints, the band may also be deposited on the support by serigraphy, the vulcanization or polymerization of the deposited material being carried out at a later stage, for instance in a tunnel kiln.

While this technique results in better productivity, it does, however, have other drawbacks. In order for the depositing to be even and of the desired shape, precise control is required. This control can be accomplished only by qualified manual labor, and this makes this technique rather onerous. Moreover, the thickness of the band that can be deposited is limited to 0.1 mm per operation, and in order to obtain a suitable thickness, several operations are generally necessary. This thickness is constant for the same band and it is therefore not possible, as in molding, to make this thickness vary at different specially selected places of the band. And finally, the loss of raw material is also appreciable in this case.

SUMMARY OF THE INVENTION

The process that has been perfected by the applicant remedies these drawbacks. More particularly, it allows one to deposit a band of elastomeric or thermosetting material on a support in a very short time, on the order of a few seconds, practically without any loss of raw material, with a considerable thickness that can amount to several millimeters, and with excellent dimensional precision. It does not require complicated implementation and is particularly reliable.

According to the invention, the process of depositing an elastomeric or thermosetting band on a plane support, particularly for fabricating impervious joints, consists in molding or injecting, at ambient temperature, the elastomer or thermoset in the viscous state into a molding cavity on a support which, in relation to the material being deposited, has an adherence that is greater than that of the molding cavity, and then carrying out the vulcanization or polymerization of the band subsequently by heating it in a furnace or by hot pressing.

Indeed, the applicant has found surprisingly that under the above-mentioned conditions the injected product does not have the tendency, as one might imagine, to remain stuck to the injection mold.

Among the deposited materials the best results among elastomers have been obtained with nitriles, polyacrylics, silicones, fluorinated elastomers, such as copolymers of fluorovinylidene and hexafluoropropylene, and among thermosets, best results have been obtained with epoxy resins. The general range of viscosities of these materials ranges from 20 to 90 on the Mooney scale.

The supports may be porous joint materials with a base of asbestos fibers or cellulose fibers, possibly reinforced with metallic elements in which case their adherence is naturally greater than that of standard molds, or they may be of metallic materials such as, for example, sheets of steel or lightweight alloys, and in this case it is preferable that their surface be dulled and roughened, such as by sanding, so as to afford better adherence. In the event that the support offers inadequate adherence, one may also use a suitable "barding primar."

It is also advantageous to carefully polish the mold or to coat it with an anti-adherent layer, such as, for example, polytetrafluoroethylene.

The invention will be more fully understood with the aid of the attached drawings.

DESCRIPTION OF THE PREFERRED EMBODIMENTS

Figure 1:
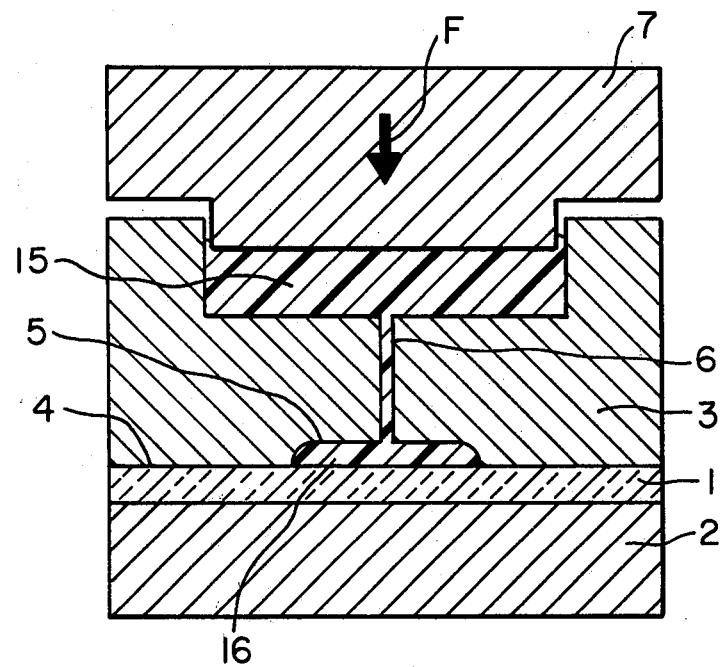
FIG. 1 is a vertical section of an embodiment of the device that allows implementation of the process of the invention.

A plane support 1, made for instance, of asbestos board reinforced interiorly by a metallic core (not shown) is placed on a metal base member 2, FIG. 1. On the upper face of the support 1 a metal block 3 is placed whose plane base 4 abuts exactly on support 1. Base 4 has one or more cavities 5, for instance, an annular cavity in the event that one desires to deposit a circular band around an orifice of a joint. One or more narrow channels 6 opens out into these cavities 5 for the purpose of feeding the material. Cavities 5 are carefully polished or coated with a thin layer of an anti-adherent product such as polytetrafluoroethylene.

Then, in the direction of arrow F, with a piston 7 under a pressure ranging from 50 to 2000 bars, one injects the elastomeric or thermosetting material 15, a silicone, for example, in viscous form (Mooney viscosity of about 50) which fills cavity 5. Block 3 is then raised and on the support 1 the band 16 remains having the shape of cavity 5.

Figure 2:
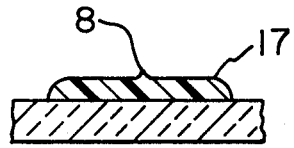
FIGS. 2, 3 and 4 are vertical sections of examples of the bands that can be made.
Figure 3:
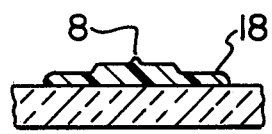
Figure 4:
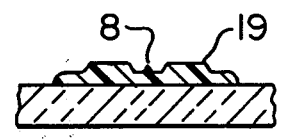

The resultant product may have a variable thickness and a variety of different shapes, as illustrated by bands 17, 18 and 19 in FIGS. 2, 3, and 4, respectively. There is usually a small peak 8 which corresponds to the entrance of channel 6.

Figure 5:
FIGS. 5 and 6 are vertical sections of an example of the band before and after hot pressing, respectively.
Figure 6:
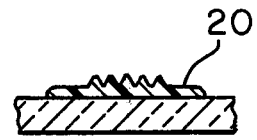

Thereafter the band is vulcanized or polymerized either by traveling through an oven or continuous kiln in which case the band retains the same width as at the time it was deposited. The band may alternatively be vulcanized or polymerized by hot pressing with the aid of a press whose plates are heated to an adequate temperature which makes it possible to impart to the band the desired definitive shape which can differ from that deposited in the mold. This is illustrated in FIGS. 5 and 6 where the same band 20 is shown before and after pressing by this latter method.

An impervious joint fabricated in this way is perfectly suitable when the tightening pressure of the joint is not too great. However, for joints that are very tightly adjusted, as in the case of cylinder head joints, an incompressible band which receives the essential part of the mechanical action is in danger of bursting when the joint is compressed.

To avoid this drawback and to assure that the deposited band can withstand compressive loading as for very tightly compressed joints, the cavity of the mold is composed of at least one groove 5' formed in the support rather than in the block 3.

When the support is made of a compressible material, for instance a porous material with a base of asbestos fibers or cellulose fibers, the band is vulcanized or polymerized so as to exactly fill the groove.

When the support is made of an incompressible material, for instance of metal, the band is vulcanized or polymerized by hot pressing so as to provide projecting portions above the support and portions that are troughed relative to the support, the projecting portions having the same total volume as the portions in the trough.

Figure 7:
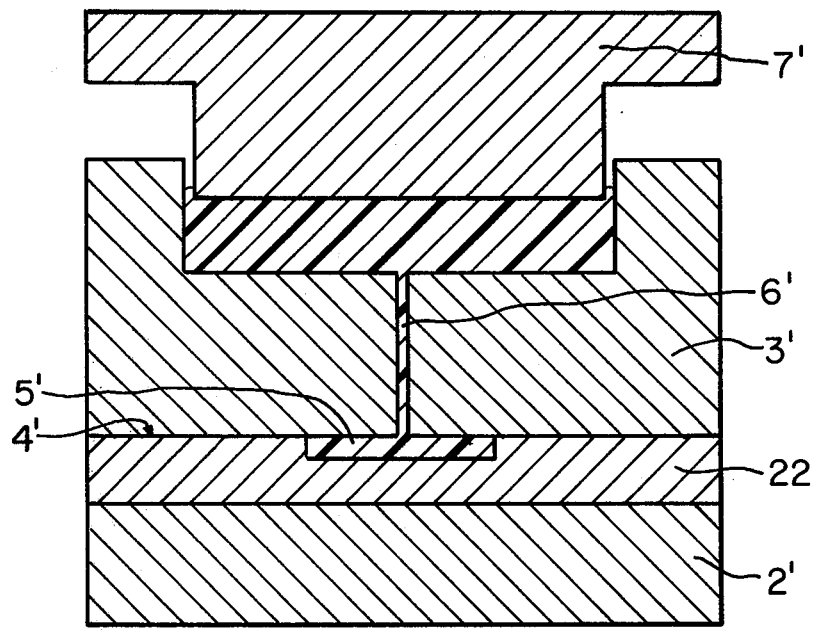
FIG. 7 is a vertical section of a variation of the device of FIG. 1.

FIG. 7 shows a device for implementing this variation. Metal plane support 22 is placed on plate 2'. On the top face of the support a metal block 3' is placed whose plane base 4' fits exactly on support 22. The support 22 has a groove 5' of any desired shape, such as for example, a rectangular section.

Block 3' has one or more narrow channels 6' for supplying the material and opens out opposite groove 5'. In the portion of block 3' opposite groove 5' the base 4' is carefully polished or coated with a thin layer of an anti-adherent product such as polytetrafluoroethylene.

Then with a piston 7' under a pressure ranging from 50 to 2000 bars one injects the elastomeric or thermosetting material in a viscous state which fills groove 5' exactly. Block 3 is then withdrawn. There is generally a small nose 8' corresponding to the entrance of the channel 6', FIG. 8.

When the support is made of compressible material, for instance, a porous material with a base of asbestos or cellulose fibers, polymerization may be carried out in an oven or a continuous kiln or by hot pressing, the band preserving the same shape as at the time when it was deposited.

Figure 8:
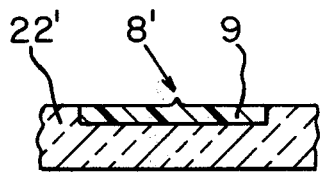
FIGS. 8 and 9 are vertical sections of bands deposited according to the variation of FIG. 7 on a compressible support and on an incompressible support, respectively.

When the joint as shown in FIG. 8 is subjected to compression with the band 9 being incompressible while the material of the support 22' being compressible, the band will project slightly outward from the support and will therefore be able to produce a tight seal. Moreover, the band 22' will slightly spread apart the support around it and therefore minimize the risk of bursting.

Figure 9:
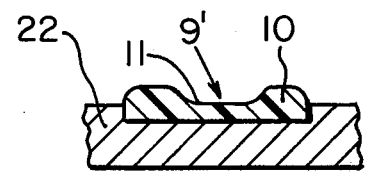

When the support 22 is made of an incompressible material, such as steel or aluminum, the vulcanization or polymerization is preferably carried out by hot pressig, so as to obtain a band configuration of the type shown in FIG. 9.

Band 9' includes end portions 10 projecting outward relative to the support 22 and a troughed portion 11 intermediate the end portions 10. The total volume of the projecting portions 10 is equal to the total volume of the troughed portion 11.

When a joint made in this way is subjected to strong compression, the projecting portions 10 assure the tightness of the seal and the joint can be deformed by movement of the projecting portions 10 into the troughed portion 11 which then prevents the joint from rupturing.

In accordance with the invention, the process also makes it possible to obtain a massive joint of elastomeric or thermosetting material by separation, after vulcanization or polymerization, from the support which has served for molding. In this case the adherence of the band to the support must, on the one hand, be sufficiently low to allow the separation of the joint from the support while on the other hand the adherence of the band to the support must be slightly greater than the band adherence to the mold.

In accordance with the process of the invention, one may make industrial joints, as well as joints intended for the automotive industry, such as cylinder head joints, impervious to oil and liquid coolants, intake and exhaust joints, impervious to gases, gasoline pump joints, oil casings and cylinder head covers and the like.

I claim:

1. A process for providing a sealing band or similar shape of vulcanizable elastomeric or polymerizable thermosetting material upon a workpiece support, said material having a Mooney viscosity between 20 and 90 (measured at 100° C.), comprising the steps for:
    A. providing a mold and a workpiece support adjacent said mold which together define a molding cavity, said support having a greater adherence to said material than said mold;

B. depositing said material into said molding cavity at ambient temperature and a temperature below which curing takes place and in the viscous state and so that substantially no curing takes place while the mold defines a portion of the molding cavity;

C. separating the mold from the support, said deposited material adhering to said support; and D. curing the deposited material by heat after separating the mold from the support to form the desired band.

2. The process of claim 1, said curing comprising vulcanizing or polymerizing said deposited material by heating in a furnace.

3. The process of claim 1, said curing comprising vulcanizing or polymerizing by hot pressing said deposited material.

4. The process of claim 1, said support being compressible and including asbestos or cellulose fibers, said mold cavity being in said mold.

5. The process of claim 1, said deposited materials selected from the group consisting of nitriles, polyacrylics, silicones, fluorinated elastomers and epoxy resins.

6. The process of claim 5, said material being one of the fluorinated elastomers fluorovinylidene and hexafluoropropylene.

7. The process of claim 1, said support being substantially incompressible and said mold cavity defined by at least one recessed portion in said support.

8. The process of claim 7, said support being abraded or coated with an adhesive layer so as to achieve said greater adherence.

9. The process of claim 7, said recessed portion having a configuration of substantially uniform cross-section and different from said cured band configuration, said curing including hot pressing the deposited material to form a cured band having projections and troughs along a surface, a volume of said projections being substantially equal to the volume defined by said troughs.

10. A process for making a gasket with a sealing band upon a gasket substrate, said band of vulcanizable elastomeric or polymerizable thermosetting material, said material having a Mooney viscosity between 20 and 90 (measured at 100° C.), comprising the steps for:

A. providing a mold and said gasket substrate adjacent said mold which together define a molding cavity, said gasket substrate having a greater adherence to said material than said mold;

B. depositing said material into said molding cavity at ambient temperature and a temperature below which curing takes place and in the viscous state and so that substantially no curing takes place while the mold defines a portion of the molding cavity;

C. separating the mold from the gasket substrate, said deposited material adhering to said gasket substrate; and D. heating the deposited material after separating the mold from the gasket substrate to cure into the desired band.

11. The process of claim 10 wherein said gasket substrate is substantially incompressible and said mold cavity is defined by at least one groove formed in said gasket substrate.

12. The method according to claims 10 or 11 wherein the gasket substrate is comprised of asbestos fibers and the sealing band is a silicone elastomer.

* * * * *

UNITED STATES PATENT AND TRADEMARK OFFICE
CERTIFICATE OF CORRECTION

PATENT NO. : 4,247,510

DATED : January 27, 1981

INVENTOR(S) : Jean Desverchere

It is certified that error appears in the above-identified patent and that said Letters Patent are hereby corrected as shown below:

In the Title:

"BANK" should read --BAND--.

Signed and Sealed this

Fourteenth Day of April 1981

[SEAL]

Attest:

RENE D. TEGTMEYER

Attesting Officer     Acting Commissioner of Patents and Trademarks